3,249,499
CONTROL OF PLANT DISEASES
Bogislav von Schmeling, Hamden, Conn., and Marshall Kulka, Dalel S. Thiara, and William A. Harrison, Guelph, Ontario, Canada, assignors to United States Rubber Company, New York, N.Y., a corporation of New Jersey
No Drawing. Filed Apr. 26, 1965, Ser. No. 451,011
9 Claims. (Cl. 167—33)

This invention relates to the control of plant diseases caused by microorganisms such as plant pathogenic fungi.

We have found that certain carboxamido oxathiins are effective biocides, especially systemic fungicides and bactericides.

The chemicals employed as new agriculturally useful biocides, in particular systemic fungicides and bactericides, have the general formula:

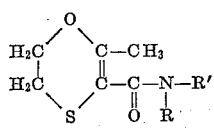

where R may be hydrogen or methyl, and R' may be alkyl, alkenyl, cycloalkyl, aryl, or substituted aryl, as will be explained in more detail below. The aryl substituent may be such bodies as halogen, alkyl or alkoxy, as will be illustrated in more detail below.

The chemicals may be termed 2,3-dihydro-5-carboxamido-6-methyl-1,4-oxathiins.

The chemicals per se are claimed in copending application Serial No. 451,048 of Marshall Kulka et al., filed of even date herewith.

The chemicals are effective soil fungicides, especially for protecting seeds and seedlings from pre-emergence and post-emergence damping-off caused by plant pathogenic soil organisms, and are effective bactericides. The chemicals possess a broad spectrum controlling effect against such soil pathogens as *Uromyces phaseoli typica* Arth. and *Rhizoctonia solani* Kühn without injury to crops. The chemicals are also bactericides controlling such economically important bacteria as *Staphylococcus aureus* Rosenbach, and otherwise useful as foliage bactericides. The systemic activity of the chemicals is of particular interest in connection with the control of internal plant diseases such as the Dutch elm disease and cereal smut.

Particularly interesting chemicals for use in the invention are those in which R is hydrogen in the formula given above. Preferred values for R' are the alkyl groups having 1 to 10 carbon atoms, especially the normal alkyls, phenyl, monosubstituted phenyl (e.g. substituted with chloro, methyl, ethoxy, or the like) and polysubstituted phenyl, such as di-substituted phenyl (e.g. 2,6-dimethylphenyl; 2,5-dichlorophenyl; 3,4-dichlorophenyl; 2-methyl-5-chlorophenyl, etc.) or trisubstituted phenyl (e.g. 2,4,6-trimethylphenyl).

The chemical may be applied to seeds by tumbling the chemical with the seeds, either alone or in admixture with a powdered solid carrier, to coat the seeds. Typical powdered solid carriers are the various mineral silicates, e.g. mica, talc, pyrophyllite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, nonionic, or cationic surface-active agents. Such surface-active agents are well known and reference is made to U.S. Patent No. 2,547,724, columns 3 and 4, for detailed examples of the same. As a seed protectant, the amount of the chemical coated on the seeds will be ¼ to 12 ounces per hundred pounds of the seed. As a soil fungicide, the chemical may be applied as a dust in admixture with sand or dirt or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil fungicide, the amount of the chemical applied to the seed rows will be from 0.1 to 10 pounds per acre applied to the seed rows the equivalent of an area 2" wide and 2" deep to parallel rows in one direction a distance of 40" apart. Also, as a soil fungicide, the chemical may be applied broadcast as a similar dust or aqueous spray with an application rate of 1.0 to 100 pounds per acre. As a foliage fungicide, the chemical may be applied to growing plants at a rate of ¼ to 10 pounds per acre. Such application is generally as an aqueous spray which also contains a surface-active dispersing agent, or a surface-active dispersing agent and a powdered solid carrier.

The chemicals used in the present invention may be prepared by various methods. One method, represented by the following equations, involves providing the appropriate known alpha-chloroacetoacetamide (III) (which may in turn be prepared in accordance with conventional practice, for example, by chlorination of the acetoacetamide (II) with sulfuryl chloride in benzene), and then reacting (III) with 2-mercaptoethanol (IV) under basic conditions. (It will be understood that alpha-bromoacetoacetamide may be used instead.) The rereaction proceeds through two intermediates V and VI, neither of which need be isolated:

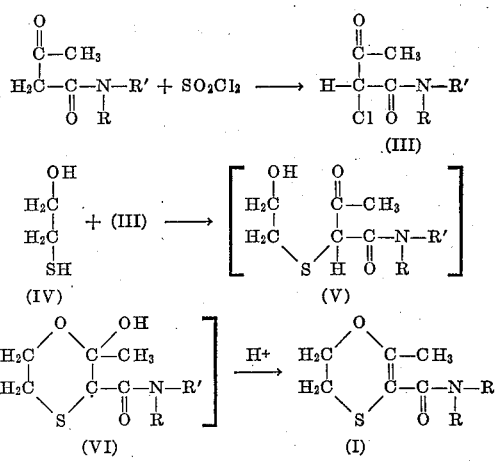

The reaction between III and IV, in the presence of a base, whether an inorganic base (e.g., alkali metal hydroxide, carbonate or bicarbonate) or an organic base (e.g. pyridine or N,N'-dimethylaniline), proceeds readily at ambient temperatures. The reaction is conveniently carried out in any solvent medium that is inert under the conditions of the reaction, such as water, alcohol, (e.g., methanol, ethanol, butanol, propanol, etc.) or other organic solvent, for example a hydrocarbon solvent such as benzene or hexane, ether, acetone, pyridine, dioxane, etc. or a mixture of such solvents. Preferably a volatile solvent is used to facilitate recovery of the product. The reaction is exothermic, and in order to prevent an undue rise in temperature one of the reactants (conveniently in solution) may be added gradually to the other (preferably in solution). External cooling may be applied if necessary, but in any case it is not necessary to maintain any particular critical temperature range. The materials may be reacted in equimolar quantities or an excess of one of the reactants may be employed if desired. When the base employed is potassium hydroxide, potassium chloride is formed during the reaction; this precipitates (when water is not the solvent) and can be filtered off. The reaction mixture at this stage contains the intermediates V or VI or both. Although the intermediates can be recovered by evaporating the solvent, this is not necessary. The intermediate V cyclizes readily to VI under slightly acid condition. The intermediate VI is readily dehydrated to yield the product I. This is conveniently accomplished by acidification of the solution for example with a small quantity of organic acid (e.g. para-toluenesulfonic acid, benzenesulfonic acid, p-chlorobenzenesulfonic acid, etc.) or inorganic acid (e.g., hydrochloric acid). The dehydration is facilitated by heating and particularly by heating under reflux conditions to drive off the water formed, conveniently as an azeotrope with benzene or the like from which the water can be separated before returning the reflux. Many possible variations in the procedure will be apparent to those skilled in the art.

Alternatively the synthesis may be carried out in one pot. After the chlorination is complete, the HCl and SO$_2$ are blown out with air and then the resulting suspension of the alpha-chloroacetoacetamide (III) in benzene is directly treated with 2-mercaptoethanol as above.

A second method for the preparation of the presently employed compound I involves ring formation first and then the amide function adjustment, as represented in the equations below. An alkyl acetoacetate such as ethyl acetoacetate (VII) (or equivalent, such as any lower alkyl [1–4 C atoms] acetoacetate) is chlorinated with sulfuryl chloride to form the known ethyl alpha-chloroacetoacetate (VIII). (It will be understood that other halogens, e.g., bromine, are also suitable.) The ethyl alpha-chloroacetoacetate (VIII) is treated with 2-mercaptoethanol (IV) in the presence of a base in a manner analagous to the first method described above, causing the formation of two intermediates IX and X, which need not be isolated. Instead the intermediates are cyclized and dehydrated by the action of acid as in the first method, conveniently by heating under reflux in a benzene solution thus removing the water azeotropically to give (XI). This ester (XI) is then hydrolyzed to 2,3-dihydro-6-methyl-1,4-oxathiin-5-carboxylic acid (XII) by boiling a short time with aqueous alkali. The acid (XII) is converted to the acid chloride (XIII) by means of thionyl chloride (or equivalent halogenating agent), and the amide (I) is then obtained from XIII by adding an amine. The acid chloride (XIII) will react with any primary or secondary amine (including hydrazine or ammonia) without limitation to form the amide (I).

The first method which is the more direct method is more sensitive to side reactions and the yields of I obtained by such method may be lower. Equations representing the second method are as follows:

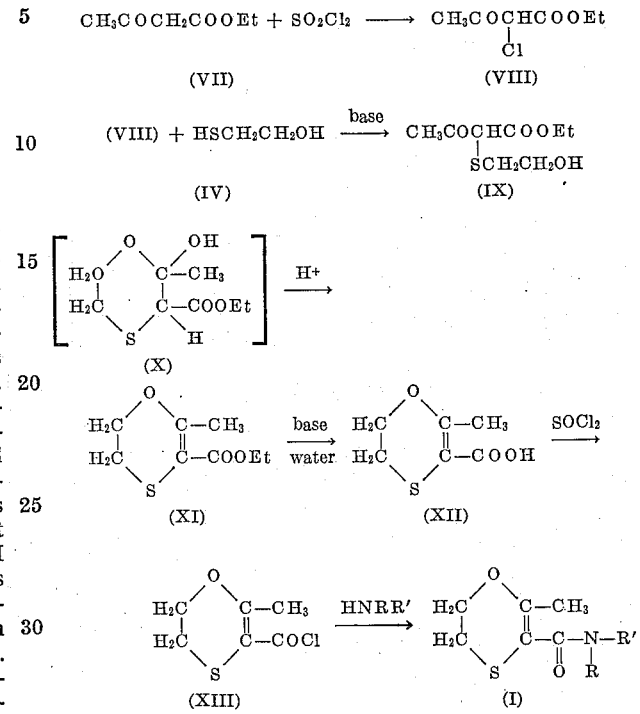

The following preparations will serve to illustrate ways of making the chemicals used in the invention.

PREPARATION A BY METHOD 1

*2,3-dihydro-5-carboxanilido-6-methyl-1,4-oxathiin*

[(I, R'=C$_6$H$_5$, R=H) Method 1 (from acetoacetanilide)]

Step I—Preparation of alpha - chloroacetoacetanilide (III, R'=C$_6$H$_5$, R=H).—To a stirred suspension of acetoacetanilide (150 g., 0.845 mole) and dry benzene (one liter) was added sulphuryl chloride (72 ml. or 120 g., 0.890 mole) dropwise over a period of 1½ hr. The stirring was continued for ½ hr. more. The product was filtered (the filtrate used in a second run in place of dry benzene gave a higher yield of alpha-chloroacetoacetanilide), washed with water and benzene and dried. Yield 131 g. (73.5%); M.P. 136–138° C. [Naik, Trivedi and Mankad, J. Indian Chem. Soc., 20, 365 (1943); Bulow and King, Ann. 439, 211 (1924)].

Step II—Preparation of 2,3-dihydro-5-carboxanilido-6-methyl - 1,4 - oxathiin using potassium hydroxide (I, R'=C$_6$H$_5$, R=H).—To a stirred suspension of alpha-chloroacetoacetanilide (63.5 g. or 0.3 mole) and dry benzene (300 ml.) was added a solution of KOH (20.4 g.), 2-mercaptoethanol (22.2 ml. or 22.5 g., 0.3 mole) and methanol (40 ml.) dropwise over a period of two hours, keeping the temperature below 30° C. The mixture was stirred for one hour more. The potassium chloride which precipitated was filtered. The solvents were removed from the filtrate by distillation. Benzene was added to the residue and then washed with water till neutral. The benzene solution was acidified with p-toluene sulfonic acid (0.8 g.) and heated under reflux using a Dean-Stark trap to collect water. The water collected was 5 ml. (theory 5.4 ml.). The solution was washed with water and the benzene removed. The residue solidified and was crystallized from 95% ethanol. Yield 45.8 g. (65%), M.P. 93–95° C.

*Step II (alternate)—Using sodium bicarbonate in place of sodium hydroxide.*—To a stirred suspension of alpha-chloroacetoacetanilide (42.3 g. or 0.2 mole) in benzene (200 ml.) and 2-mercaptoethanol (17 g.) was added a solution of sodium bicarbonate (22 g.) in water (150 ml.) portionwise in one hour. The reaction mixture was further stirred until all the solids went into solution (½ hr.). The benzene layer was separated, washed with water, acidified with p-toluene-sulfonic acid (0.5 g.) and then heated under reflux, removing the water (3.5 cc.) formed by azeotropic distillation using a Dean-Stark trap. The reaction mixture was cooled, washed with water and the solvent removed. The residue was crystallized from methanol. Yield 27 g.; M.P. 93–94° C.

The mother liquors were taken to dryness but the viscous oily residue would not crystallize. This was dissolved in benzene, washed with aqueous sodium hydroxide and with water and the benzene removed. The residue solidified quickly and crystallized from methanol. Yield 8.5 g.; M.P.=92–93° C.; total yield 35.5 g. (75%).

PREPARATION A BY METHOD 2

[From ethyl acetoacetate (VII)]

*Step I—Preparation of ethyl-alpha-chloroacetoacetate (VIII).*—[Allihn, Ber., 11, 567 (1878); Boehme, W. R., Org. Syn., vol. 33, 43 (1953)].—To a stirred and cooled solution of ethyl acetoacetate (260 g. or 2 moles) was added sulphuryl chloride (270 g. or 2 moles) over 3 hours, keeping the temperature between 0° and 5° C. The reaction mixture was left over night. The $SO_2$ and HCl were removed on a water pump. The residual dark liquid was distilled at reduced pressure. After a small fore-run the liquid distilling between 88–90° C. (at 15 mm). was collected. Yield 300 g. (91%).

*Step II—Preparation of ethyl 2,3-dihydro-6-methyl-1,4-oxathiin-5-carboxylate (XI).*—To a cooled and stirred solution of ethyl alphachloroacetoacetate (33 g. or 0.2 mole) and dry benzene (200 ml.) was added a solution of potassium hydroxide (13.6 g.); 2-mercaptoethanol (15.0 ml. or 15.6 g.) and methanol (30 ml.) over a period of 1½ hr. keeping the temperature below 30° C. The reaction mixture was stirred for ½ hour more. The potassium chloride formed was filtered. The solvents were removed from the filtrate. Benzene was added to the residue and then washed with water. The benzene solution was acidified with p-toluene-sulfonic acid and the water (3.4 ml.; theory 3.6 ml.) was collected by azeotropic distillation using the Dean-Stark trap. The reaction mixture was cooled, washed with water and then the benzene removed. The residue was distilled under high vacuum; B.P. (1 mm.) 107–110° C.; yield=23 g. (61.2%). This compound was also prepared using sodium bicarbonate as in Method 1A instead of potassium hydroxide. The yield was 76%.

*Step III—Preparation of 2,3-dihydro-5-carboxy-6-methyl-1,4-oxathiin (XII).*—To a solution of ethyl 2,3-dihydro-6-methyl-1,4-oxathiin-5-carboxylate (188 g.) in 95% ethanol (50 ml.) was added a solution of NaOH (60 g.) in water (400 ml.). The reaction mixture was heated under reflux until the two layers became homogeneous (about one-half hour).

The solution was cooled, diluted with water and acidified with dilute HCl. The white solid which precipitated was filtered *at once*, washed with water and dried in air. Yield 134 g. (84%); M.P. 178–180° C. Recrystallized material from ethanol melts at 180–181° C.

*Step IV—Preparation of 2,3-dihydro-5-carboxanilido-6-methyl-1,4-oxathiin* (I, R'=C₆H₅, R=H).—To a suspension of 2,3-dihydro-5-carboxy - 6-methyl-1,4-oxathiin (XII) (32 g. or 0.2 mole) in chloroform (200 ml.) was added thionyl chloride (16 ml.) and the solution was heated under reflux. Hydrogen chloride and sulfur dioxide were evolved and all the solids went into solution in two hours. The excess thionyl chloride and solvent were removed in vacuo. To the residue (XIII) dissolved in chloroform (or benzene) was added a solution of aniline (37.2 g.) in chloroform (or benzene), portionwise. The aniline hydrochloride which formed was filtered. The filtrate was washed with very dilute HCl solution and then with water. The chloroform (or benzene) was removed and the residue solidified at once. It was recrystallized from 95% ethanol. Yield 38 g. (80%); M.P. 93–94° C.

In accordance with the procedures used for preparing Product A above, the following chemicals useful in the invention may be prepared. For each product there is listed.

Product A:
   (1) The name of the 5-substituent in the product
   (2) The name of the amine employed in the preparation
   (3) The value of R'
   (4) The M.P. of the product, ° C.
   (5) The yield, in percent; in cases marked with an asterisk (*) the yield is based on the alphachloro-N-substituted-acetoacetamide; the unmarked yields are based on 2,3-dihydro-5-carboxy-6-methyl-1,4-oxathiin Product B:
   (1) N-(o-methyl)carboxanilido or N-(o-tolyl)carboxamido
   (2) o-Toluidine
   (3) o-Tolyl
   (4) 88–89 (MeOH)
   (5) 43* (method 1)

Product C:
   (1) N-(m-methyl)carboxanilido or N-(m-tolyl)carboxamido
   (2) m-Toluidine
   (3) m-Tolyl
   (4) 83–85 (MeOH)
   (5) 46* (method 1) and 75 (method 2)

Product D:
   (1) N-(p-methyl)carboxanilido or N-(p-tolyl)carboxamido
   (2) p-Toluidine
   (3) p-Tolyl
   (4) 95–98
   (5) 14 (method 2)

Product E:
   (1) N - (2-chloro)phenylcarboxamido or N - (o-chloro)carboxanilido
   (2) o-Chloroaniline
   (3) o-Chlorophenyl
   (4) 83–85 (MeOH)
   (5) 44* (method 1)

Product F:
   (1) N - (4-chloro)phenylcarboxamido or N - (p-chloro)carboxanilido
   (2) p-Chloroaniline
   (3) p-Chlorophenyl
   (4) 130–132 (MeOH)
   (5) 48* (method 1)

Product G:
   (1) N-(2-biphenyl)carboxamido or N-(2-phenyl)carboxanilido
   (2) 2-aminobiphenyl
   (3) 2-biphenyl
   (4) 125–127 (MeOH)
   (5) 23 (method 2)

Product H:
   (1) N-(n-butyl)carboxamido
   (2) n-Butylamine
   (3) n-Butyl
   (4) 85–86
   (5) 70 (method 2)

Product I:
  (1) N-cyclohexylcarboxamido
  (2) Cyclohexylamine
  (3) Cyclohexyl
  (4) 127–128
  (5) 77 (method 2)
Product J:
  (1) N-allylcarboxamido
  (2) Allylamine
  (3) Allyl
  (4) 73
  (5) 66 (method 2)
Product K:
  (1) N-(alpha-naphthyl)carboxamido
  (2) Alpha-naphthylamine
  (3) 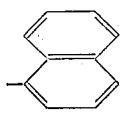
  (4) 125–127 (MeOH)
  (5) 21 (method 2)
Product L:
  (1) N-(p-ethoxyphenyl)carboxamido or N-(p-ethoxy)carboxanilido
  (2) p-Ethoxyaniline
  (3) p-Ethoxyphenyl
  (4) 120–122
  (5) 50 (method 2)
Product M:
  (1) N-methyl, N-phenylcarboxamido
  (2) N-methylaniline
  (3) R=$CH_3$; R'=phenyl
  (4) 111–114
  (5) 72 (method 2)
Product N:
  (1) N-(2,4-dimethylphenyl)carboxamido or N-(2,4-dimethyl)carboxanilido
  (2) 2,4-dimethylaniline
  (3) 2,4-dimethylphenyl
  (4) 76–78 (EtOH)
  (5) 32 (method 2)
Product O:
  (1) N-(m-methoxyphenyl)carboxamido or N-(m-methoxy)carboxanilido
  (2) m-Methoxyaniline
  (3) m-Methoxyphenyl
  (4) 83–84.5
  (5) 65 (method 2)

The following examples illustrate the invention. All parts and percentages are by weight.

*Example 1*

The ability to control plant diseases which are already established in the plants was evaluated by employing the following testing technique.

Two hundred milligrams chemical are dissolved in 20 ml. of acetone and 60 mg. of a surfactant such as Tween-20 which is polyoxyethylene sorbitan monolaurate. This preparation is diluted with 80 ml. distilled water giving a chemical suspension of 2000 p.p.m. Further serial dilutions are prepared from this as desired. The chemical suspensions are sprayed on duplicate pots, each containing three snap bean plants which had, 48 hours prior to this, been inoculated with bean rust *Uromyces phaseoli typica* Arth. The spray application is made with a gun-type sprayer delivering 2.5 ml. per second. At the time of the chemical spray the bean plants have just begun to expand their first trifoliate leaves. The test plants are then placed in a control chamber for 24 hours at 75° F. and 100% relative humidity. After this time the plants are returned to the greenhouse. About 10 days later the plants are scored for disease control.

TABLE I.—THE SYSTEMIC FUNGICIDAL EFFECT OF CARBOXAMIDO OXATHIIN DERIVATIVES AS MEASURED BY THEIR ABILITY TO CONTROL THE BEAN RUST DISEASE

| Chemical | P.p.m. | Percent control |
| --- | --- | --- |
| 2,3-dihydro-5-carboxanilido-6-methyl-1,4-oxathiin. | 12.5 | 60 |
| | 25 | 95 |
| | 50 | 99 |
| | 100 | 100 |
| 2,3-dihydro-5-N-(o-tolyl) carboxamido-6-methyl-1,4-oxathiin. | 12.5 | 30 |
| | 25 | 65 |
| | 50 | 90 |
| | 100 | 100 |
| 2,3-dihydro-5-N-(m-tolyl) carboxamido-6-methyl-1,4-oxathiin. | 12.5 | 30 |
| | 25 | 80 |
| | 50 | 100 |
| | 100 | 100 |
| 2,3-dihydro-5-N-(p-tolyl) carboxamido-6-methyl-1,4-oxathiin. | 125 | 40 |
| | 500 | 90 |
| | 2,500 | 100 |
| 2,3-dihydro-5-N-(2-chlorophenyl) carboxamido-6-methyl-1,4-oxathiin. | 500 | 0 |
| | 2,000 | 90 |
| 2,3-dihydro-5-N-(4-chlorophenyl) carboxamido-6-methyl-1,4-oxathiin. | 500 | 0 |
| | 2,000 | 75 |
| 2,3-dihydro-5-N-(2-biphenyl) carboxamido-6-methyl-1,4-oxathiin. | 125 | 90 |
| | 500 | 96 |
| | 2,000 | 99 |
| 2,3-dihydro-5-N-(n-butyl) carboxamido-6-methyl-1,4-oxathiin. | 125 | 25 |
| | 500 | 100 |
| 2,3-dihydro-5-N-(cyclohexyl) carboxamido-6-methyl-1,4-oxathiin. | 50 | 60 |
| | 100 | 97 |
| | 200 | 100 |
| 2,3-dihydro-5-N-(allyl) carboxamido-6-methyl-1,4-oxathiin. | 500 | 10 |
| | 2,000 | 35 |
| 2,3-dihydro-5-N-(alpha-naphthyl) carboxamido-6-methyl-1,4-oxathiin. | 500 | 0 |
| | 2,000 | 35 |
| 2,3-dihydro-5-N-(p-ethoxyphenyl) carboxamido-6-methyl-1,4-oxathiin. | 500 | 10 |
| | 2,000 | 75 |
| 2,3-dihydro-5-(N-methyl, N-phenyl) carboxamido-6-methyl-1,4-oxathiin. | 500 | 80 |
| | 2,000 | 98 |
| 2,3-dihydro-5-N-(2,4-dimethylphenyl) carboxamido-6-methyl-1,4-oxathiin | 125 | 100 |
| 2,3-dihydro-5-N-(m-methoxyphenyl) carboxamido-6-methyl-1,4-oxathiin | 125 | 100 |

Structure shown in table (for 2,3-dihydro-5-carboxanilido-6-methyl-1,4-oxathiin):

$$H_2C\diagdown O \diagup C(CH_3) \atop H_2C \diagdown S \diagup C-C(=O)-N(H)-C_6H_5$$

The results show that the presently employed compounds are effective chemotherapeutic agents, the most effective members being 2,3-dihydro-5-carboxanilido-6-methyl-1,4-oxathiin, 2,3-dihydro-5-N-(o-tolyl)carboxamido-6-methyl-1,4-oxathiin, and 2,3-dihydro-5-N-(m-tolyl) carboxamido-6-methyl-1,4-oxathiin.

*Example 2*

This example shows a seed treatment test designed to investigate the systemic fungicidal effect of the compounds of this invention using the following method.

Eighty-seven milligrams chemical were applied to 70 grams snap bean seed (*Phaseolus vulgaris*), this amount being equivalent to an application rate of two ounces of chemical per 100 pounds of seed. The treated seed was tumbled for 45 minutes by mechanical rotation in an eight ounce glass jar. The seed was then planted in 4" greenhouse pots using 5 seeds per pot replicated five times, giving a total of 25 seeds per treatment. The test was conducted in a dosage series including snap bean seeds which were not chemically treated as checks. After planting the seeds the test was transferred to the greenhouse using subirrigation for watering the pots and allowing the seeds to germinate. After 10 days the plants which had fully expanded their primary leaves were inoculated with bean rust spores and incubated for 24 hours at 75° F. and 100% relative humidity. The plants were then returned to the greenhouse and regularly watered by subirrigation. Ten days later the plants were examined for development of the bean rust disease and compared with the untreated check. The results were as follows:

TABLE II.—CONTROL OF BEAN RUST BY SEED TREATMENT

| Chemical | Oz./100 lbs. | Percent control |
|---|---|---|
| Untreated check | | 0 |
| 2,3-dihydro-5-carboxanilido-6-methyl 1,4-oxathiin | 2 | 25 |
| | 4 | 75 |
| | 8 | 98 |

The results show that the chemical was translocated from the seeds into the foliage, making the leaves resistant to the bean rust disease.

EXAMPLE 3

This example evaluates chemicals of this invention when used as soil treatments for their ability to control the foliar bean rust disease.

Thirty-three milligrams of the chemical were thoroughly mixed in a glass jar with one pound of clean, dry sand. This masterbatch was then mixed with 6¼ pounds of steam sterilized soil to give a 10 p.p.m. concentration of chemical in the soil-sand mixture. The treated soil was then placed into five 4″ pots in which five snap bean seeds per pot were planted. Five replications were used giving a total of 25 seeds per treatment. An untreated check, i.e., 5 snap beans seeds per 4″ pot planted in soil which had not been chemically treated, replicated five times, was included in the test. The pots were transferred to the greenhouse and kept moist by subirrigation. Ten days later at the time the primary leaves were fully expanded the plants were inoculated with bean rust spores as described in Example 2. The results were taken 10 days after the inoculation had been made by inspecting the bean foliage for bean rust symptoms and comparing the plants grown in treated soil with those grown in untreated soil. The results were as follows:

TABLE III.—CONTROL OF BEAN RUST BY SOIL TREATMENT

| Chemical | P.p.m. | Percent control |
|---|---|---|
| Untreated check | | 0 |
| 2,3-dihydro-5-carboxanilido-6-methyl-1,4-oxathiin | 10 | 98 |
| | 20 | 100 |

The results show that 2,3-dihydro-5-carboxanilido-6-methyl-1,4-oxathiin controlled the bean rust disease when used as a soil treatment. There was no difference in appearance of the plant growth between the plants grown in treated and those grown in untreated soil.

EXAMPLE 4

This example evaluates chemicals of this invention as soil fungicides for their effectiveness to control soil-borne plant seedling diseases such as post-emergence, damping-off of cotton seedlings caused by *Rhizoctonia solani* Kühn.

The test method used was as follows:

Sixty-six mg. of the chemical were thoroughly mixed in a glass jar with one pound of clean, dry sand. The mixing was accomplished by vigorously shaking the jar which was covered with a screwcap. This master-batch was then thoroughly mixed with 6¼ pounds of soil to give a 20 p.p.m. (parts per million) concentration of chemical and the soil-sand mixture. The treated soil was then placed into five 4″ diameter pots in which 5 cotton seeds, variety Fox-4, per pot were planted. Before covering the planted seed the pots were inoculated by placing a grain of oats, infested with *Rhizoctonia solani* Kühn from a two week old culture, in the center of each pot surrounded by the cotton seed. The seed and the inoculum were then covered with a layer of soil about ½″ thick. Five replications were used giving a total of 25 seeds for each chemical treatment. An untreated check, replicated five times, in which seeds were planted and the inoculum of *Rhizoctonia solani* was placed on the soil in the center of the 4″ pot but without the chemical treatment, was included in the test. Also a check, replicated five times, was included where seeds were planted in soil without chemical treatment and without the inoculum of the organism. After the planting was completed the pots were then transferred to the greenhouse, watered and kept under warm and moist conditions by using subirrigation and temperature control in maintaining 72° F. to 78° F. soil temperature. Results were taken two to three weeks later by counting the number of emerged and surviving cotton seedlings. The percent stand of cotton seedlings is calculated using the following formula:

$$\text{Percent stand} = \frac{\text{number of seedlings surviving}}{\text{number of seedlings emerged}} \times 100$$

The following table gives the percent emergence and percent stand of cotton seedlings for chemical treatment with the chemicals listed at a concentration of 20 p.p.m., which is equivalent to an application rate of 0.6 pound/acre of the chemicals applied to the seed rows the equivalent of the area 2″ wide and 2″ deep to parallel rows in one direction a distance of 40″ apart as compared to the untreated inoculated and untreated, uninoculated soil checks.

TABLE IV.—SOIL FUNGICIDAL RESULTS OF *R. SOLANI* TEST WITH COTTON USING APPLICATION RATE OF 20 P.P.M. CHEMICAL IN THE SOIL

| R′ | Percent emergence | Percent stand |
|---|---|---|
| Phenyl | 80 | 80 |
| o-Tolyl | 88 | 88 |
| m-Tolyl | 76 | 76 |
| 2-chlorophenyl | 80 | 68 |
| 4-chlorophenyl | 52 | 48 |
| Cyclohexyl | 76 | 64 |
| Untreated inoculated soil (check) | 56 | 16 |
| Untreated uninoculated soil (check) | 76 | 76 |

It can be seen from the table that the chemicals of this invention are effective soil fungicides preventing post-emergence damping-off of cotton seedlings.

EXAMPLE 5

This example evaluates chemicals of this invention as systematic fungicides by using them as seed treatments for the prevention of seedling diseases such as are caused by the fungus *Rhizoctonia solani* which attacks cotton seedlings.

Sixty-two milligrams chemical are applied to 50 grams acid delinted cotton seed in a glass jar. The seed is treated by tumbling for 45 minutes. The seed is then planted in 4″ pots using 5 seeds/pot and a total of 25 seed/treatment. In the center of each pot a grain of oats, infested with *Rhizoctonia solani* is placed, which is surrounded by the treated cotton seed. The seed and inoculum is covered with a layer of soil about ½″ thick and the test is then transferred to the greenhouse where the pots are kept moist by subirrigation. A temperature of 72° to 78° F. is maintained for the test. Two untreated checks are included in the test, one containing the untreated seeds plus the inoculum, the other containing untreated seeds without the inoculum. Each untreated check is replicated five times with a total of 25 seeds. One week later the emergence of the cotton seed is recorded and after an additional week the stand of the cotton seedlings is recorded. The results were as follows:

TABLE V.— PREVENTION OF POST-EMERGENCE DAMPING-OFF OF COTTON SEEDLINGS WITH SEED TREATMENTS

| Chemical | Oz./100 lbs. | Percent emergence | Percent stand |
|---|---|---|---|
| 2,3-dihydro-5-carboxanilido-6-methyl-1,4-oxathiin. | 2.0 | 88 | 76 |
|  | 4.0 | 92 | 80 |
| Untreated inoculated soil (check). |  | 64 | 0 |
| Untreated uninoculated soil (check). |  | 100 | 100 |

The above data show that 2,3-dihydro-5-carboxanilido-6-methyl-1,4-oxathiin prevented post-emergence damping-off of cotton seedlings when used as a seed treatment.

EXAMPLE 6

This example evaluates chemicals of this invention as bactericides by the following agar plate technique.

Thirty-five mg. chemical was dissolved in 5 ml. of acetone to which was added 45 ml. of 0.01% aqueous solution of Triton X–100 (surface-active wetting agent) which is isooctyl phenyl polyethoxy ethanol. Three ml. of this chemical preparation was pipetted into a 50 ml. Erlenmeyer flask containing 5 ml. nutrient medium and kept liquified in a water bath at 47° C. The bacterial inoculum consisting of a spore suspension of *Staphylococcus aureus* Rosenbach was then added to this preparation at the amount of 0.25 ml. per flask. Thus the flask contained a chemical construction of 255 p.p.m. This preparation was then poured into 2½" Petri plates and incubated at 30° C. Similar tests were made at a concentration of the chemical of 128 p.p.m. The results were taken 24 hours later by examining the plates for bacterial growth with a bacterial colony counter and comparing the chemical treatment with an untreated, inoculated check. The results are shown in the following Table VI.

TABLE VI.—BACTERICIDAL TEST

| Chemical | P.p.m. | 24 hours |
|---|---|---|
| 2,3-dihydro-5-carboxanilido 6-methyl 1,4-oxathiin. | 128 | None. |
|  | 255 | Do. |
| 2,3-dihydro-5-N-(o-tolyl) carboxamido 6-methyl 1,4-oxathiin. | 255 | Do. |
| Untreated inoculated check. |  | Severe. |

The above results show that the compounds of this invention are effective bactericides.

The present chemicals may be used along with other fungicides, insecticides, bactericides and the like. Thus, the present oxathiin systemic fungicides can be used together with other seed treatment materials such as fungicides and insecticides. This is illustrated in the following Table VII, which shows the results obtained with two fungicides of the invention when evaluated in accordance with the procedure described in Example V, above, using commercially treated seed, i.e., seed which had previously been treated with a mercury fungicide for the prevention of rotting.

TABLE VII.—PREVENTION OF POST-EMERGENCE DAMPING-OFF OF COTTON SEEDLINGS WITH SEED TREATMENTS

| Chemical | Oz./100 lbs. | Percent emergence | Percent stand |
|---|---|---|---|
| 2,3-dihydro-5-N-(o-tolyl) carboxamido-6-methyl-1,4-oxathiin | 4 | 84 | 84 |
|  | 8 | 92 | 92 |
| 2,3-dihydro-5-N-(m-tolyl) carboxamido-6-methyl-1,4-oxathiin | 4 | 88 | 72 |
|  | 8 | 88 | 84 |

The results obtained with the chemicals of the invention in the greenhouse are confirmed by field tests, exemplified by the use of 2,3-dihydro-5-N-(m-tolyl)carboxamido-6-methyl-1,4-oxathiin, for example, as a highly effective systemic fungicide in preventing the development of *Rhizoctonia solani* disease symptoms on the stems of the beans. The rates used in this field test were 2 and 4 oz./100 pounds of bean seed.

Having thus described our invention, what we claim and desire to protect by Letters Patent is:

1. The method of controlling fungi and bacteria which comprises applying thereto a chemical of the formula

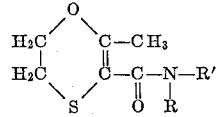

wherein R is selected from the group consisting of hydrogen and methyl, and R' is selected from the group consisting of alkyl having from 1 to 10 carbon atoms, allyl, cyclohexyl, phenyl, biphenyl, naphthyl, and mono-, di-, and tri-substituted phenyl wherein the substituent is halogen, lower alkyl or lower alkoxy.

2. The method of controlling bacteria and fungi comprising applying to loci subject to attack by bacteria and fungi a chemical of the formula

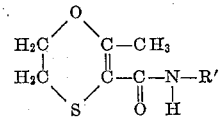

wherein R' is selected from the group consisting of straight chain alkyl having from 1 to 10 carbon atoms, phenyl, chlorophenyl, tolyl and ethoxyphenyl.

3. The method of controlling bacteria and fungi on plant life comprising applying to the plant life 2,3-dihydro-5-(N-substituted)carboxamide-6-methyl-1,4-oxathiin wherein the N-substitutent is selected from the group consisting of N-phenyl, N-tolyl, N-chlorophenyl, N-2-biphenyl, N-butyl, N-cyclohexyl, N-allyl, N-alpha-naphthyl, N-p-ethoxyphenyl, (N-methyl-N-phenyl), N-m-methoxyphenyl, and N-2,4-dichlorophenyl.

4. A method of controlling fungi and bacteria harmful to plant life comprising applying to the plant life 2,3-dihydro-5-carboxanilido-6-methyl-1,4-oxathiin.

5. A method of controlling fungi and bacteria harmful to plant life comprising applying to the plant life 2,3-dihydro-5-N-(m-tolyl)carboxamido-6-methyl-1,4-oxathiin.

6. A method of controlling fungi and bacteria harmful to plant life comprising applying to the plant life 2,3-dihydro-5-N-(o-tolyl)carboxamido-6-methyl-1,4-oxathiin.

7. A method of controlling fungi and bacteria harmful to plant comprising applying to the plant life 2,3-dihydro-5-N-(n-butyl)carboxamido-6-methyl-1,4-oxathiin.

8. A method of controlling fungi and bacteria harmful to plant life comprising applying to the plant life 2,3-dihydro-5-N-(2,4-dimethylphenyl)carboxamido-6-methyl-1,4-oxathiin.

9. A method of controlling fungi and bacteria harmful to plant life comprising applying to the plant life 2,3-dihydro-5-N-(m-methoxyphenyl)carboxamido-6-methyl-1,4-oxathiin.

No references cited.

JULIAN S. LEVITT, *Primary Examiner.*

S. J. FRIEDMAN, *Assistant Examiner.*